UNITED STATES PATENT OFFICE 2,639,317

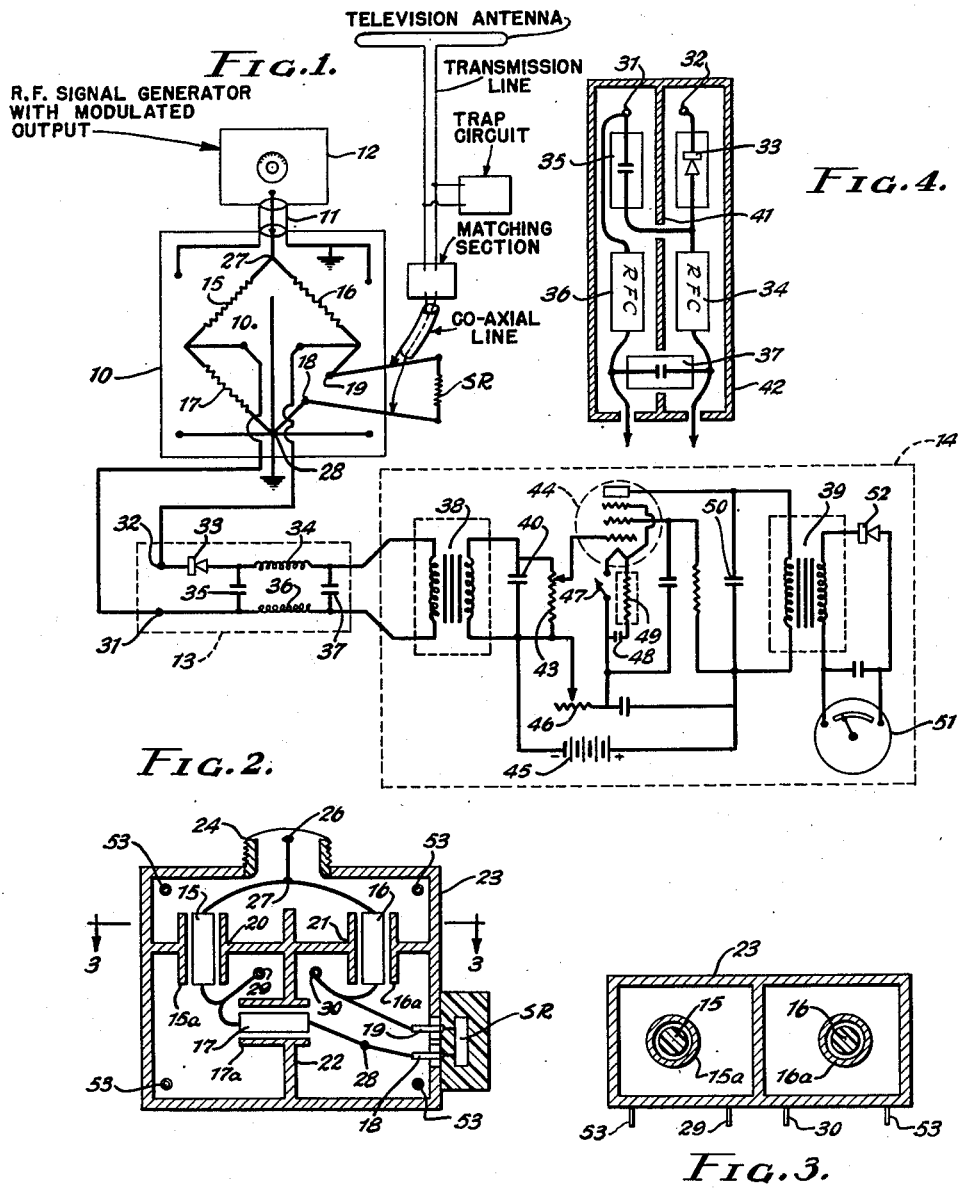

APPARATUS FOR DETERMINING IMPEDANCE CHARACTERISTICS OF TRANSMISSION LINES

John Oden Bennett, Bartow, Fla.

Application December 8, 1949, Serial No. 131,776

5 Claims. (Cl. 175—183)

This invention relates to electrical devices employing shielded bridge devices for determining transmission characteristics, impedance ratios and the standing wave ratios of transmission lines such as are employed in the transmission and reception of television and other high frequency signals.

An object of this invention is to provide an improved measuring device of such nature that it may be readily used by servicemen engaged in the installation and servicing of television and radio receiving sets for obtaining reliable indications of transmission characteristics of transmission lines used in such sets.

Another object of this invention is to provide a measuring device for obtaining reliable indications of the impedance characteristics of transmission lines such as are used for transmission or reception of television or other high frequency signals.

Another object of this invention is to provide a measuring device for obtaining indications of the standing wave ratios of transmission lines used in the transmission and reception of television or other high frequency signals.

Still another object of this invention is to provide a standing wave ratio indicating device that may be readily calibrated to indicate ratios of two to one, three to one, four to one, etc.

A further object of this invention is to provide an improved standing wave ratio indicating device for transmission lines and embodying a frequency selective amplifier connected to supply a meter for indicating ratios of various magnitudes.

Still a further object of this invention is to provide a shielded bridge device for use in making impedance measurements on transmission lines such as are used in television and radio sets, said shielded bridge device consisting of different plug-in shielded bridge units for different impedance ratios.

Still another object of this invention is to provide an apparatus for indicating on a calibrated meter scale, the impedance characteristic of a transmission line;

Still a further object of this invention is to provide an apparatus for rapidly measuring the impedance characteristic of a transmission line over a wide band of frequencies;

Another object of this invention is to provide an apparatus for rapidly measuring the characteristic impedance of a transmission line and antenna assembly over a wide band of frequencies;

Still another object of this invention is to provide an apparatus for tuning or adjusting "Q" or matching sections, said apparatus providing a means for indicating on a calibrated meter scale, the ratio of impedance mismatch so that mathematical calculations are not required;

Still another object of this invention is to provide an apparatus for indicating the impedance ratio of transmission lines, using very low power excitation and eliminating the need for measuring the distribution of high frequency currents and voltages along the line;

A further object of this invention is to provide an apparatus for tuning or adjusting trap circuits of "stubs" which are attached to a transmission line;

Still another object of this invention is to provide an apparatus for indicating on a calibrated meter scale, the effectiveness of trap circuits attached to a transmission line for attenuating a particular frequency or band of frequencies and also for directly indicating reactions of the trap circuits at the operating frequencies;

A further object of this invention is to provide an apparatus useful for indicating on a calibrated meter scale, characteristics of antenna tuning units such as are used to produce single side bands or vestigial side band characteristics.

In accordance with this invention there is provided an electrical bridge of the Wheatstone type particularly adapted for use with ultra high frequency signal apparatus. This shielded bridge is made in the form of miniature plug-in units adapted to be plugged into the amplifier and meter circuits. The shielded bridge devices of this invention are provided with a co-axial input coupling that is adapted to be coupled to the output of an amplitude modulated signal generator of the type used in servicing radio receivers. The output or meter circuit of the shielded bridge device is provided with suitable pins or plugs adapted to be inserted into jacks associated with a rectifier and isolation circuit which has an output connected to the input transformer of an amplifier. This amplifier is provided with an output transformer in addition to the afore said input transformer and both of these transformers are adjusted to be resonant or to give peak response at the modulation frequency of the aforesaid modulated signal generator. The output transformer of the amplifier is connected to a rectifier and meter circuit which is appropriately calibrated. The calibration procedure and other details of this invention will be described in further paragraphs of this specification in conjunction with the description of the drawing.

Referring to the drawing briefly,

Fig. 1 is a schematic wiring diagram of an embodiment of this invention;

Fig. 2 is a sectional view taken through one of the plug-in shielded bridge devices;

Fig. 3 is a section view taken along the line 3—3 of Fig. 2;

Fig. 4 is a detail view showing the arrangement of the parts and shielding in the rectifier and isolation circuit connected between the bridge and the amplifier, and Fig. 5 is a view of the exterior of an embodiment of a cabinet arrangement that may be employed in this apparatus.

In the drawing this invention is illustrated both schematically to show the various connections of the component parts, and more or less pictorially to show the actual placement of the physical components since this is important in the use of the invention.

As pointed out above, this apparatus consists of several shielded plug-in bridge devices 10 each of which is provided with a co-axial input 11 adapted to be connected to a modulated signal generator 12. These plug-in shielded bridge devices 10 are adapted to be plugged into the input of the rectifier and isolation circuit 13, the output of which is fed into the amplifier 14.

Each of the shielded bridge devices 10 is provided with standard non-inductive resistors 15, 16 and 17 connected to form three legs of the Wheatstone bridge. The fourth leg is connected to the jacks 18 and 19 so that various transmission lines or other non-inductive calibrated resistors may be plugged into these jacks 18 and 19 to form the fourth leg of the bridge. The resistors 15 and 16 of the bridge are conventional non-inductive resistors selected to be matched. The resistor 17 and the resistors adapted to be plugged into the jacks 18 and 19 are also non-inductive and these are selected to match the characteristic impedance of the transmission line to be measured. These latter resistors are therefore not necessarily matched to the resistors 15 and 16. Furthermore at least two resistors are provided for use in the fourth leg of the bridge, one of these resistors is calibrated to match or equal the ohmic resistance of the resistor 17 and the other resistor is calibrated to be twice this ohmic resistance. These resistors are preferably assembled in an insulated holder having terminals adapted to be plugged into the jacks 18 and 19.

The shielded bridge device 10 is preferably arranged as shown in Figs. 2 and 3 in which the resistors 15, 16 and 17 are supported by the wire leads thereof inside of tubular shielding members 15a, 16a and 17a that are soldered into small holes formed in the partitions 20, 21 and 22, respectively. These partitions 20, 21 and 22 are soldered together and to the inside of the container 23 so as to form compartments and the tubular members 15a, 17a and 18a extend into these compartments so as to be at least coextensive with the resistors 15, 16 and 17. Furthermore, these tubular members 15a, 16a and 17a are of such size as to provide very little spacing between the interiors thereof and the corresponding resistors so that these tubular members function efficiently as electrostatic shields. The aforesaid partitions 20, 21 and 22 are also part of the electrostatic shielding arrangement as is the container 23. In order to complete the shielding the container 23 is closed on all sides by sheet metal such as copper and the only openings therein are those necessary for connecting the bridge device into the circuits with which it is to be employed.

The co-axial input coupling device 24 is provided on one side of the housing 23 and this coupling consists of a threaded member adapted to be coupled to the co-axial line 25 leading to the modulated signal generator 12. The inner conductor of the co-axial line is connected to the terminal 26 and to the resistors 15 and 16. The threaded coupling of the co-axial input is soldered or otherwise attached to the shielding housing 23 and one terminal of the resistor 17 and the jack 18 are also connected to this housing 23 so that the modulated high frequency signal from the generator 12 is fed across the Wheatstone bridge between the points 27 and the grounded point 28.

The output or measuring terminals 29 and 30 of the bridge are supported on the suitable insulating members in order to be insulated from the housing 23 and these terminals protrude from the back of this housing to engage the input jacks 31 and 32 of the rectifier and isolation circuit shown in Fig. 4. The terminal 29 is connected to the resistors 15 and 17 and the terminal 30 is connected to the resistor 16 and the jack 19.

The rectifier and isolation circuit 13 consists of a rectifier 33 having one terminal connected to the input pin 32 and having the other terminal connected to one end of the radio frequency choke 34 and one side of the capacitor 35. The other side of the capacitor 35 is connected to the input pin 31 and one end of the radio frequency choke 36. The other end of the choke 34 is connected to one side of the capacitor 37 and to one terminal of the primary of the amplifier input transformer 38. The other end of the choke 36 is connected to the other side of the capacitor 37 and to the other terminal of the primary of the transformer 38.

The rectifier 33 functions as a detector of the modulated high frequency signal obtained from the output of the bridge 10 and the detected signal is supplied to the primary of the transformer 38. This detected signal may consist of a low frequency such as a 400 cycle or a 1,000 cycle modulation applied to the oscillations generated by the modulated signal generator 12. Any other modulating frequency in the audio or low frequency range may be used. However, the input transformer 38 and the output transformer 39 must be made to be resonant or must be peaked at the selected modulating frequency so as to be selectively responsive to this frequency. In the case of the transformer 38 the selective response may be obtained by connecting a capacitor 40 across the secondary, of such size as to produce resonance in the secondary at the selected modulated frequency.

Both transformers 38 and 39 are shielded to reduce feedback therebetween. Suitable shielding is also provided between certain components of the rectifier and isolation circuit 13 as shown in Fig. 4. This circuit is located in a two compartment shield that is built into the amplifier and meter cabinet 14a of the apparatus shown in Fig. 5. This two compartment shield is shown in the plan view Fig. 4. The rectifier 33 and the capacitor 35 are separated by a shielding partition 41 that is soldered to the ends and sides of the housing 42 and divides the inside of this housing into two compartments. This partition 41 extends throughout the housing 42 and also separates the chokes 34 and 36. The connection between the capacitor 35 and the coke 34 and rectifier 33 passes through a suitable aperture in the partition 41 and the capacitor 37 is supported in another aperture formed in this partition.

The input potentiometer 43 of the amplifier is connected across the secondary of the transformer 38 and the wiper contact of this potentiometer is connected to the control grid of the variable Mu pentode 44. The anode of the pentode 44 is connected to one terminal of the primary of the transformer 39 and the other terminal of this primary is connected to the positive terminal of the battery 45. The negative terminal of the battery 45 is connected to the lower end of the potentiometer 43 and to the wiper contact of the bias controlling resistance 46 which is connected to one side of the pentode filament switch 47. The filament battery 48 is connected to the pentode filament through the switch 47 and the ballast resistor 49.

The primary of the transformer 39 is tuned to the modulating frequency by the capacitor 50 that is connected across this primary. The secondary of the transformer 39 has one terminal thereof connected to one side of the meter 51 direct and the other terminal is connected to the other side of the meter 51 through the rectifier 52. The meter 51 is a direct current meter of the D'Arsonval type and the rectifier 52 converts the audio frequency output of the transformer 39 into a direct current which is used to deflect the meter pointer.

The meter 51 is of the D'Arsonval type and is provided with magnet pole pieces shaped so that the deflection of the pointer is linear with respect to the current fed to the coil of the meter. The scale of this meter is calibrated in terms of impedance ratios as follows: zero meter deflection equals unity or one to one ratio and the numeral 1 is accordingly placed at the position of zero deflection of the pointer. The numeral 2 on the scale equals two to one impedance ratio, the numeral 3 on the scale equals three to one impedance ratio, the numeral 4 equals a four to one impedance ratio and full scale deflection is indicated by the infinity legend ∞. The calibration technique for placing this meter in operation is such that minute strays or minute conditions of unbalance in the bridge, residual responses in the amplifier are compensated for by accurately adjusting the mechanical zero adjustment of meter 51 using the standard resistor SR. This assures accurate indications of impedance matching in the vicinity of unity matching. Also, the use of specially shaped pole pieces in the meter to expand the scale as indications approach unity increase the sensitivity and accuracy of the bridge to small variations from ideal matching.

The method of calibration and technique for using this meter are as follows:

First the operator selects the shielded bridge unit 10 corresponding to the surge or characteristic impedance of the transmission line to be tested. For this purpose there are provided several shielded bridge devices such as shown in Fig. 2. One of these devices is made particularly for testing parallel type transmission lines of the 300 ohm twin lead ribbon type now used in television and FM receivers. Another shielded bridge may be made especially for testing coaxial transmission lines of 72 ohm impedance and another for coaxial lines of 52 ohm impedance. Still others may be made for lines of other impedances. As previously mentioned these shielded bridge devices are made in small compact units adapted to be plugged into the input of the rectifier and isolation circuit which is provided with jacks 31 and 32 for receiving the pins 29 and 30. These pins 29 and 30 and the corner pins 53 attached to the housing of the bridge device may be used for supporting the housing 23 on the front of the amplifier and meter cabinet as shown in Fig. 5. The pins 53 may also function at the same time to connect the shielding housing 23 to the shielding housing or cabinet of the amplifier and meter.

The transmission line to be tested is next connected to the jacks 18 and 19 on the side of the shielded bridge device. In this test the transmission line is open, that is, it is not provided with any terminating resistance or load. After the transmission line is connected to the bridge device the signal generator 12 connected to the co-axial input, is adjusted to provide sufficient output to produce full scale deflection on the meter 51 which corresponds to an infinite standing wave ratio indication. The unterminated transmission line is then disconnected from the bridge device and a standard resistor SR corresponding to the characteristic impedance of this transmission line is connected to the jacks 18 and 19. For this purpose the standard resistors that are to be connected to the jacks 18 and 19 may be encased in suitable insulation such as "Bakelite," "Polystyrene" and the like and provided with pin terminals adapted to be inserted into the jacks 18 and 19. With the standard resistor corresponding to the characteristic impedance of the transmission line, connected to the bridge device as described and with the output of the signal generator 12 set at the level just described, another reading is obtained on the meter 51 corresponding to the one to one impedance ratio. Since this reading should be one, which corresponds to the zero deflection of the meter pointer as previously described the pointer of the meter 51 is adjusted to one, that is, to zero deflection. The standard resistor is disconnected from the bridge device and the unterminated transmission line is reconnected to the terminals or jacks 18 and 19. The output of the signal generator 12 is then readjusted to give full scale deflection of the meter 51 and thereafter the unterminated transmission line is disconnected and a standard resistor equal to twice the ohmic resistance of the aforesaid standard resistor SR is connected to the jacks 18 and 19. The potentiometer 43 of the amplifier 14 is then adjusted to cause the meter 51 to deflect to the number 2 legend on the scale to indicate a two to one ratio. The second standard resistor is then disconnected from the bridge device and the unterminated transmission line is reconnected to the jacks 18 and 19. The signal generator output is next adjusted to produce full scale deflection of the meter 51. This line is then disconnected from the bridge device and the first standard resistor SR is reconnected. Thereafter the zero adjustment of the meter 51 is again adjusted to unity, that is, the one to one ratio reading. The first standard resistor is then disconnected and the unterminated transmission line is reconnected and the signal generator output is again adjusted to give full scale deflection on the meter 51. The line is next disconnected and the second standard resistor is connected to the bridge device and the amplifier input potentiometer 43 is adjusted until the meter pointer is deflected to 2 on the scale indicating a two to one ratio. The bridge device and amplifier are now calibrated and ready for use.

The bias potentiometer 46 of the amplifier is not adjusted in the field since it is used in making the initial calibration performed at the factory or when replacing the amplifier tube or any other components in the amplifier and meter circuits. When such repair work is performed the bias potentiometer 46 is adjusted to select an operating characteristic of the variable Mu tube 44 that will give an accurate indication at the number 3 and number 4 ratio calibrations on the meter 51. When this bias adjustment is made standard resistors must be connected to the bridge jacks 18 and 19 of such value as to produce the number 3 and number 4 ratio indications.

As hereinbefore pointed out this apparatus is primarily useful for measuring the impedance characteristic of high frequency transmission lines, terminations, and tuning sections thereof.

Inasmuch as reliable impedance indications are obtained using a modulated signal generator, adjustments to tuning sections, trap circuits, antennas, etc. may be safely made without turning off the power or disconnecting the apparatus on which the measurements are being made.

When the constant "K" of a transmission line is not accurately known, it may be quickly determined with this apparatus by adjusting a section of the line for a given condition of resonance and then measuring the length of the line and referring to the frequency of signal generator 12, Fig. 5.

In the field, service engineers and technicians can quickly measure the impedance versus frequency characteristic of an antenna and transmission line assembly by varying the frequency of oscillator 12, Fig. 5.

Also, the effectiveness of a trap circuit or "stub" can be quickly appraised by searching the spectrum for its resonant frequency or frequencies. This procedure also gives the before and after impedance characteristic at the operating frequency of a transmission line without and with a trap circuit.

When additional elements are added to an antenna array for directors and reflectors, or when additional antennas are "stacked" the problem of providing a suitable matching section is greatly simplified when a technician can readily measure the terminated impedance characteristic of the transmission line.

The impedance characteristics of tuned sections used for single side band or vestigial side band tuning of antennas such as are used in two-way communication and television transmissions may be quickly checked without putting the transmitter into operation. Preliminary adjustments to these units are therefore possible without danger of damage to valuable components or personnel.

This apparatus is constructed and calibrated so that it may be used by technicians to measure the impedance characteristic of transmission lines and various terminations at various frequencies without performing mathematical calibrations. The technique of adjusting a transmission line, antennae, matching section, or a trap circuit, for operation on a specific channel is reduced to the simple process of adjusting the components to produce the best impedance match at the receiver or transmitter termination. The effectiveness of trap circuits is appraised by their impedance characteristics. For example, a good trap circuit across a transmission line should produce an indication on the meter approaching infinity mismatch. Likewise, an ideal transmission line and termination should produce an indication on the meter approaching unity, for example, 1.1 to 1 impedance ratio is considered to be an ideal termination at high frequencies.

The various features of this invention have been set forth in detail, however, it is not desired to limit this invention to the exact details described except insofar as those details are defined in the claims.

I claim:

1. A method for calibrating an impedance bridge device for measuring standing wave ratios in transmission lines adapted to be used in the transmission or reception of television signals comprising the steps of connecting an unterminated transmission line to a bridge device, supplying a signal to the input of the bridge device from a signal generator of such strength that the indicator of the bridge device gives a full scale indication indicating a standing wave ratio for the unterminated line approaching infinity, disconnecting said unterminated transmission line and connecting a calibrated resistor in place thereof of a magnitude calcuated to produce a one to one impedance ratio in said bridge device and adjusting the zero adjustment of the indicator to obtain such an indication thereon, disconnecting said last mentioned calibrated resistor and reconnecting said unterminated transmission line in place thereof and thereafter readjusting the output of said signal generator so that said indicator again gives a full scale indication, disconnecting said unterminated transmission line from said bridge device and connecting in place thereof another resistor having substantially twice the resistance of said calibrated resistor and then adjusting the signal input of said amplifier so that the deflection of said indicator is twice the deflection obtained for said one to one impedance ratio.

2. Apparatus for adjusting impedance matching sections connected to antenna arrays such as are used in television signal apparatus comprising a shielded impedance bridge device, a transmission line connected to said bridge device, an antenna array and a matching section connected to said bridge through said transmission line for adjustment, said bridge device having an input circuit, a source of high frequency oscillations connected to said input circuit, said source having means for amplitude modulation of said oscillations at a predetermined low frequency, said bridge device having an output circuit, a detector connected to said output circuit, a frequency selective low frequency amplifier connected to the output of said detector to selectively amplify oscillations of said predetermined low frequency, and a meter calibrated to measure the terminated impedance characteristic of said transmission line.

3. Apparatus for adjusting installations of trap circuits across transmission lines such as are used in television signal apparatus, comprising a shielded impedance bridge device, a transmission line having a trap circuit connected thereto, means for connecting said transmission line to said bridge device, said bridge device having an input circuit, a source of high frequency oscillations connected to said input circuit, said source having means for amplitude modulation of said oscillations at a predetermined low frequency, said bridge device having an output circuit, a detector connected to said output circuit, a frequency selective low frequency amplifier connected to the output of said detector to selectively amplify oscillations of said predetermined low frequency, and a meter connected to said amplifier, said meter being calibrated to indicate the degree of impedance match when said trap circuit is connected to said transmission line, said trap circuit being proportioned to produce a reading approaching infinity impedance ratio on said meter.

4. Apparatus for measuring the characteristic impedance of transmission lines and antennas, such as are used in the transmission or reception of television signals, comprising a shielded impedance bridge device having three legs made up of shielded resistors of predetermined values and terminals connected to the fourth leg of said bridge device, said terminals being adapted to be connected to a transmission line having an antenna connected to the other end thereof, said bridge device having an input circuit, a source of high frequency oscillations connected to said input circuit, said source having means for amplitude modulation of said oscillations at a predetermined low frequency, said bridge device having an output circuit, a detector connected to said output circuit, a frequency selective low frequency amplifier connected to the output of said detector to selectively amplify oscillations of said predetermined low frequency, and a meter calibrated to indicate the degree of impedance match between the transmission line and the antenna connected thereto, said meter being connected to the output of said amplifier.

5. Apparatus for measuring the characteristic impedance of transmission lines and antennas, such as are used in the transmission or reception of television signals, over a wide band of frequencies comprising a shielded impedance bridge device having three legs made up of shielded resistors of predetermined values and terminals connected to the fourth leg of said bridge device, said terminals being adapted to be connected to a transmission line having an antenna connected to the other end thereof, said bridge device having an input circuit, a source of high frequency oscillations connected to said input circuit, means for varying the frequency of said source over a frequency band for which said antenna is to be used, said source having means for amplitude modulation of said oscillations at a predetermined low frequency, said bridge device having an output circuit, a detector connected to said output circuit, a frequency selective low frequency amplifier connected to the output of said detector to selectively amplify oscillations of said predetermined low frequency, and a meter calibrated to indicate the degree of impedance match between the transmission line and the antenna connected thereto as the frequency of said source is varied over said band, said meter being connected to the output of said amplifier.

JOHN ODEN BENNETT.

References Cited in the file of this patent

UNITED STATES PATENTS

| Number | Name | Date |
|---|---|---|
| 2,232,792 | Levin | Feb. 25, 1941 |
| 2,288,030 | Salinger | June 20, 1942 |
| 2,323,076 | Paul | June 29, 1943 |
| 2,329,098 | Browning et al. | Sept. 7, 1943 |
| 2,416,790 | Barrow | Mar. 4, 1947 |
| 2,425,084 | Cork et al. | Aug. 5, 1947 |
| 2,527,979 | Woodward, Jr. | Oct. 31, 1950 |
| 2,579,751 | Muchmore | Dec. 25, 1951 |